(12) United States Patent
Sheng (10) Patent No.: US 8,612,686 B2
(45) Date of Patent: Dec. 17, 2013

(54) RESOURCE POOL MANAGING SYSTEM AND SIGNAL PROCESSING METHOD

(75) Inventor: Lanping Sheng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 943 days.

(21) Appl. No.: 12/683,013

(22) Filed: Jan. 6, 2010

(65) Prior Publication Data

US 2010/0185818 A1    Jul. 22, 2010

(30) Foreign Application Priority Data

Jan. 21, 2009  (CN) .......................... 2009 1 0001996

(51) Int. Cl.
*G06F 12/08* (2006.01)
(52) U.S. Cl.
USPC ........................... 711/118; 711/119; 711/122
(58) Field of Classification Search
None
See application file for complete search history.

(56) References Cited

U.S. PATENT DOCUMENTS

| | | | | | |
|---|---|---|---|---|---|
| 4,467,414 | A | * | 8/1984 | Akagi et al. ................... | 711/119 |
| 4,816,993 | A | * | 3/1989 | Takahashi et al. .............. | 712/28 |
| 5,001,665 | A | * | 3/1991 | Gergen et al. ................. | 711/207 |
| 5,655,090 | A | * | 8/1997 | Weingart ........................ | 712/25 |
| 5,829,028 | A | * | 10/1998 | Lynch et al. ................... | 711/126 |
| 5,954,811 | A | * | 9/1999 | Garde ............................. | 712/35 |
| 6,002,882 | A | * | 12/1999 | Garde ............................. | 712/35 |
| 6,266,717 | B1 | * | 7/2001 | Dworkin et al. ................ | 710/51 |
| 6,813,734 | B1 | * | 11/2004 | Bhardwaj ....................... | 714/48 |
| 7,761,688 | B1 | * | 7/2010 | Park .............................. | 712/200 |
| 2002/0059509 | A1 | * | 5/2002 | Sasaki ............................ | 712/19 |
| 2004/0093465 | A1 | * | 5/2004 | Ramchandran ................ | 711/131 |
| 2005/0058059 | A1 | * | 3/2005 | Amer ............................. | 370/210 |
| 2005/0182806 | A1 | * | 8/2005 | Krishnamoorthi et al. ... | 708/404 |
| 2006/0155958 | A1 | * | 7/2006 | Duller et al. ................... | 712/24 |
| 2008/0229075 | A1 | * | 9/2008 | Froemming et al. .......... | 712/210 |
| 2008/0244220 | A1 | * | 10/2008 | Lin et al. ........................ | 712/4 |
| 2008/0288728 | A1 | * | 11/2008 | Farooqui et al. .............. | 711/149 |

OTHER PUBLICATIONS

Telecommunications Industry Association, "Physical Layer Standard for cdma2000 Standards for Spread Spectrum Systems" TIA/EIA Interim Standard. TIA/EIA/IS-2000.2-A, Mar. 2000.
3$^{rd}$ Generation Partnership Project, "Technical Specification Group Radio Access Network; Base Station (BS) Radio Transmission and Reception (FDD)" (Release 9) 3GPP TS 25.104. V9.4.0, Jun. 2010.
IEEE Standard for Local and Metropolitan Area Networks, "Part 16: Air Interface for Fixed and Mobile Broadband Wireless Access Systems—Amendment 2: Physical and Medium Access Control Layers for Combined Fixed and Mobile Operation in Licensed Bands and Corrigendum 1" IEEE Std. 802.16e-2005 and IEEE Std. 802.16-2004/Cor1-2005. Feb. 28, 2006.

* cited by examiner

*Primary Examiner* — Sheng-Jen Tsai
*Assistant Examiner* — Ramon A Mercado
(74) *Attorney, Agent, or Firm* — Brinks Gilson & Lione (57) ABSTRACT

A resource pool managing system and a signal processing method are provided in embodiments of the present disclosure. On the basis of the resource pool, all filters on links share one set of operation resources and cached resources. The embodiment can be adapted to support different application scenarios with unequal carrier rates while mixing modes are supported and the application scenarios with unequal carrier filter orders. The embodiment also supports each stage of filters of the supporting mode-mixing system to share one set of multiply-adding and cached resources to unify the dispatching of resources in one resource pool and maximize the utilization of resources, and supports the parameterized configuration of the links forward-backward stages, link parameter, carrier rate, and so on.

11 Claims, 6 Drawing Sheets

RESOURCE POOL MANAGING SYSTEM AND SIGNAL PROCESSING METHOD

CROSS-REFERENCE TO RELATED APPLICATION

This application claims priority to Chinese Patent Application No. 200910001996.7, filed on Jan. 21, 2009, which is hereby incorporated by reference in its entirety.

FIELD OF THE DISCLOSURE

This disclosure relates to the field of communication technology, and in particular, to a resource pool managing system and a signal processing method.

BACKGROUND

Figure 1:
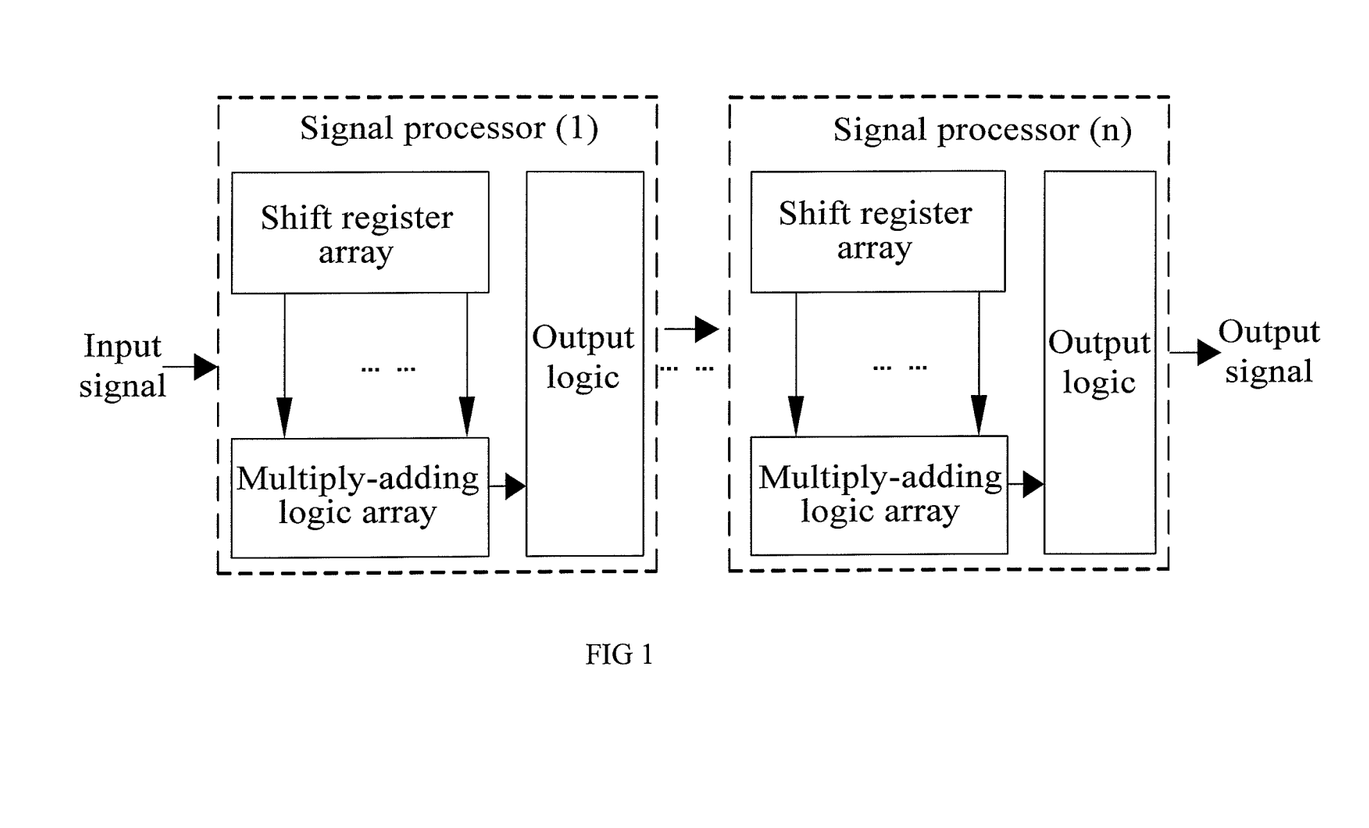
FIG. 1 shows a schematic of processing IF signal in the prior art.

With the rapid development of wireless communication technology, the continuous evolution of wireless protocol has highlighted the importance of mode-mixing base stations in the future market, mainly as follows: wireless network is developing from 2G to 3G and the Global System For Mobile Communication (GSM) network needs to realize the smooth transition to 3G network, and therefore base stations are required to support GSM systems at the very beginning. In addition, the base stations must maintain the capability for the carriers from GSM to the Universal Mobile Telecommunications System (UMTS) to coexist in an operator's frequency in the process of switching networks and the capability of mixing modes in different systems while switching completely to UMTS. The continuous evolution of 3G protocols also requires wireless base stations to mix modes in different modes, for example, base stations for the Wideband Code Division Multiple Access (WCDMA) needs to evolve toward a Long Term Evolution (LTE) amid protocol evolution. In addition, base stations may also need to switch between different standards. For example, CDMA2000 base stations need to smoothly switch to WCDMA or directly upgrade to LTE. FIG. 1 shows the processing of intermediate frequency (IF) signals. As shown in FIG. 1, most prior-art IF signal processing chips support the signal processing system in a single communication mode only, and does not have the ability to simultaneously support multiple bandwidth carrier signals.

The prior art which supports the IF signal processing system in a single communication mode has the following shortcomings:

Each stage of filters, i.e. signal processors, has a fixed number of shift registers, so the supported maximum orders of the filters are fixed;

each stage of filters has a fixed number of multipliers, and therefore, the supported maximum processing bandwidth of the filters is fixed;

the multiply-adding and caching resources cannot be shared among the filters, i.e. the multiply-adding and caching resources of one stage of filters cannot be used by other filters; and the change of link relationships, such as forward and backward, the change of link parameters, such as filter order and carrier number, or the change of carrier rate may cause redesign of links, and therefore, the universality of the system is poor.

SUMMARY

A resource pool managing system is provided in an embodiment of the present disclosure. The system includes:

a node caching module which includes multiple node caching channels for caching node input data and node intermediate data, adapted to provide reference information for a controlling module to read and dispatch data cached by a node caching channel, obtain data cached by the relevant node caching channel according to a mapping selecting signal sent by the controlling module, and cache the node intermediate data which is output by a resource pool module in a relevant node caching channel according to a node write enable signal sent by the controlling module;

a mixed-mode caching module which includes multiple multiplier channels, adapted to cache and dispatch a data array involved in the processing of the resource pool module, cache data of the node caching channel selected by the controlling module in a relevant multiplier channel of the data array according to an write address signal sent by the controlling module, and obtain data cached in a relevant column of the data array according to an read address signal sent by the controlling module;

the resource pool module, adapted to perform filtering operations on the data cached in the relevant column of the data array which is output by the mixed-mode caching module and output the node intermediate data or result data obtained by performing the filtering operation according to a resource pool selecting signal, a resource pool cache selecting signal, and an output selecting signal that are sent by the controlling module; and the controlling module, adapted to control the node caching module, the mixed-mode caching module, and the resource pool module.

A signal processing method is provided in an embodiment of the present disclosure. The method comprises:

receiving and caching, by multiple node caching channels in a node caching module, node input data and node intermediate data, and reading data cached in a relevant node caching channel according to a mapping selecting signal sent by a controlling module;

caching, by a mixed-mode caching module, received data read from the node caching module in a relevant multiplier channel of a data array involved in the processing of a resource pool module according to a write address signal sent by the controlling module; and obtaining the data cached in the relevant column of the data array obtained by the mixed-mode caching module according to a read address signal sent by the controlling module, performing filtering operations on the data to obtain the node intermediate data or result data, by the resource pool module, according to a resource pool selecting signal and a resource pool cache selecting signal sent by the controlling module, and sending the node intermediate data to the node caching module, by the resource pool module, according to an output selecting signal sent by the controlling module.

A resource pool managing system and a signal processing method are provided in the embodiments of the present disclosure. On the basis of the resource pool, all filters on links share one set of operation resources and cached resources. The embodiments can be adapted to support different application scenarios with unequal carrier rates and the application scenarios with unequal carrier filter orders. Filter resources can be distributed according to needs. Each stage of filters of the system shares one set of multiply-adding and caching resources to unify the dispatching of resources in one resource pool and maximize the utilization of resources. In addition, this can make full use of resources and improve the system extensibility.

DETAILED DESCRIPTION

The technical solution of the embodiments of the present disclosure will be further described with reference to the accompanying drawings and exemplary embodiments.

Figure 2:
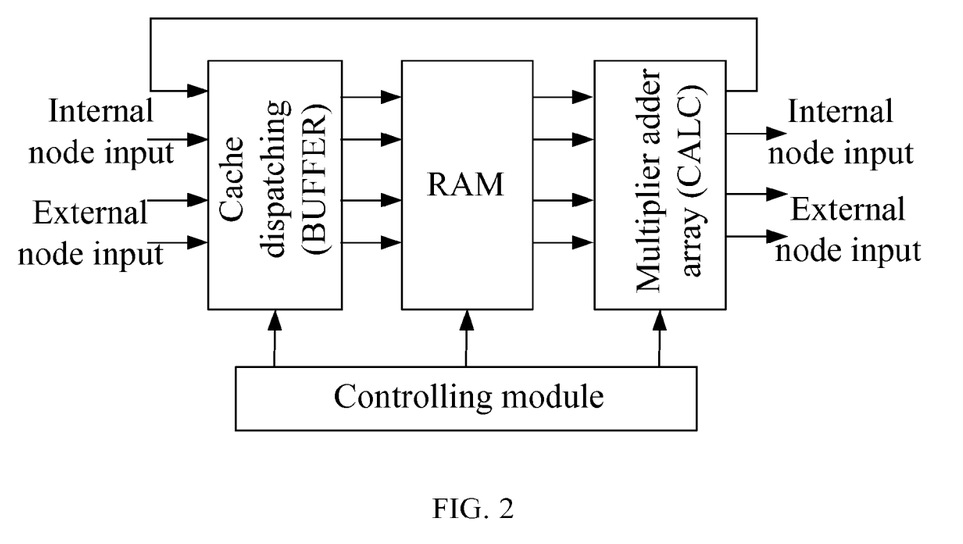
FIG. 2 shows a structure of a resource pool managing system in embodiment 1 of the present disclosure.

With the continuous development of wireless communication technology, mixed-mode base stations as the important network equipment have given more requirements on the design of multi-carrier filters in the IF channel. Considering the processing of IF signals, and because the main resource consumption is from multiply-adding operation array and caching resources, all filters (and other signal processors) on a link are considered to share one set of operation resources and caching resources. That is, all operation resources and caching resources are included in one big resource pool, and upon the logic, the resources are automatically distributed according to the priority configuration and channel congestion. FIG. 2 shows a structure of a resource pool managing system in embodiment 1 of the present disclosure. As shown in FIG. 2, the resource pool managing system comprises BUFFER, RAM, and CALC functional modules which may help flexibly configure the bandwidth, order, and carrier number of the IF channel based on the implementation idea of resource pool in an embodiment of the present disclosure. It may be understood that: a node provides a filter on a carrier; an external node represents the link input and output; an internal node represents the interface connection among filters; BUFFER represents the cache dispatching after the node input; RAM caches the data and coefficient of the finite impulse response filters (that is, FIR filters); CALC is a multiplier adder array; the controlling module enables each clock to send the to-be-computed cell into the CALC for operation and then send them out. The embodiments of the present disclosure are described on the basis of design of the Application Specific Integrated Circuit (ASIC) for processing mixed-mode IF signals to introduce how to process IF signals of mixed-mode signals by using the design method of the resource pool.

Figure 3:
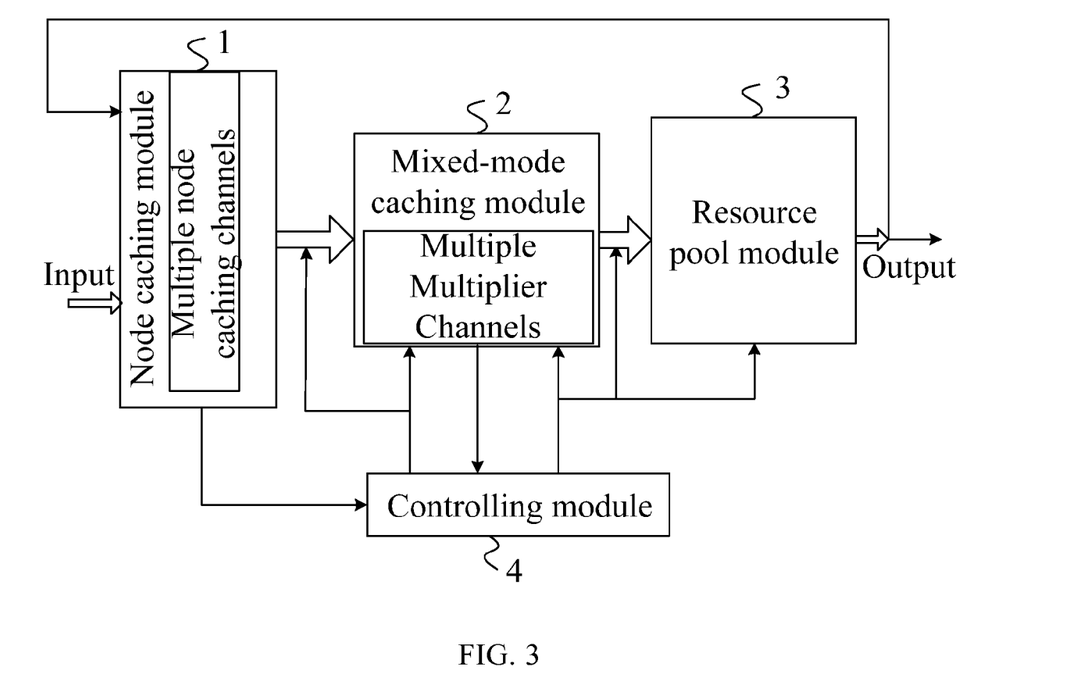
FIG. 3 shows a structure of a resource pool managing system in embodiment 2 of the present disclosure.

FIG. 3 shows a structure of a resource pool managing system in embodiment 2 of the present disclosure. As shown in FIG. 3, the system comprises a node caching module 1, a mixed-mode caching module 2, a resource pool module 3 and a controlling module 4, wherein the controlling module 4 is adapted to control the node caching module 1, the mixed-mode caching module 2 and the resource pool module 3. The node caching module 1 comprises multiple node caching channels, which are adapted to cache the node input data and node intermediate data. The node input data is the data directly input to the node caching module 1 from the external part. As to the node intermediate data, the data should be processed through filters in multiple stages, re-cached in the node caching module 1 for the next processing before finishing the multiple stages of processing and after the previous stage through the resource pool module 3, output from the node caching module 1 when the polling is processed, and then matched with the data in the mixed-mode caching module 2 and re-input into the resource pool module 3 for the next stage of processing. If the processing is completed, the data is output from the resource pool module 3; if the processing is not completed, another similar processing in circulation is required. The intermediate data during such processing is called the node intermediate data. The node caching module 1 may also detect the counting of each node caching channel, send the storage status of the node caching channel to the controlling module 4, and provide reference information for the controlling module 4 to read and dispatch the data cached by the node caching channel. The controlling module 4 generates the mapping selecting signal from the node caching module 1 to the mixed-mode caching module 2 according to the reference information and indicates the node caching module 1 the data to be read. The node caching module 1 obtains the data cached by the relevant node caching channel according to the mapping selecting signal sent by the controlling module 4. When the resource pool module 3 outputs the node intermediate data, the controlling module 4 sends the node write enable signal to the node caching module 1 to indicate to cache the node intermediate data output by the resource pool module 3 to the relevant node caching channel. The node caching module 1 caches the node intermediate data in the relevant node caching channel according to the node write enable signal.

The mixed-mode caching module 2 is adapted to cache and dispatch a data array involved in the processing of the resource pool modules. The mixed-mode caching module 2 comprises multiple multiplier channels. The controlling module 4 sends the mapping selecting signal and meanwhile a write address signal to the mixed-mode caching module 2. The mixed-mode caching module 2 caches the data of the node caching channel selected by the controlling module 4 in the relevant multiplier channel of the data array according to the write address signal sent by the controlling module 4. When the data filling in the data array meets the requirements for outputting, for example, when one column of data is already filled up, the mixed-mode caching module 2 sends the indication of full node data to the controlling module 4. Upon receipt of the indication, the controlling module 4 sends a read address signal to the mixed-mode caching module 2. The mixed-mode caching module 2 obtains the data cached in the relevant column of the data array according to the read address signal and gets ready to output the data to the resource pool module 3 for filtering.

The resource pool module 3 is adapted to perform filtering operations on the data cached in the relevant column of the data array which is output by the mixed-mode caching module 2 and output the node intermediate data or result data obtained by performing the filtering operations according to a resource pool selecting signal, a resource pool cache selecting signal, and an output selecting signal sent by the controlling module 4. The controlling module 4 sends the read address signal to the mixed-mode caching module 2, and meanwhile can also send the resource pool selecting signal, the resource pool cache selecting signal, and the output selecting signal to the resource pool module 3. The array data output by the mixed-mode caching module 2 is reorganized under the control of the resource pool selecting signal and finds out the multiplier in the resource pool module 3. The addition chain is reorganized under the control of the resource pool cache selecting signal after the processing of the multiplier array. The resource pool module 3 outputs the data processed through the addition array and multiplication array under the control of the output selecting signal; if the next stage of processing is needed, output to the node caching module 1; if it is the final result, output directly.

A resource pool managing system is provided in an embodiment of the present disclosure. On the basis of a resource pool, all filters (and other signal processors) on the link share one set of operation resources and caching resources. The embodiment can be adapted to support different application scenarios with unequal carrier rates (bandwidth) while mixing modes and the application scenarios with unequal carrier filter orders. Filter resources can be distributed according to needs. The embodiment also supports each stage of filters of the supporting mode-mixing system to share one set of multiply-adding and caching resources to unify the dispatching of resources in one resource pool and maximize the utilization of resources, and supports the parameterized configuration of the links forward-backward stages, link parameter, carrier rate, and so on. Filter structures are highly parameterized. The embodiment may make full use of resources and improve the system extensibility.

Figure 4:
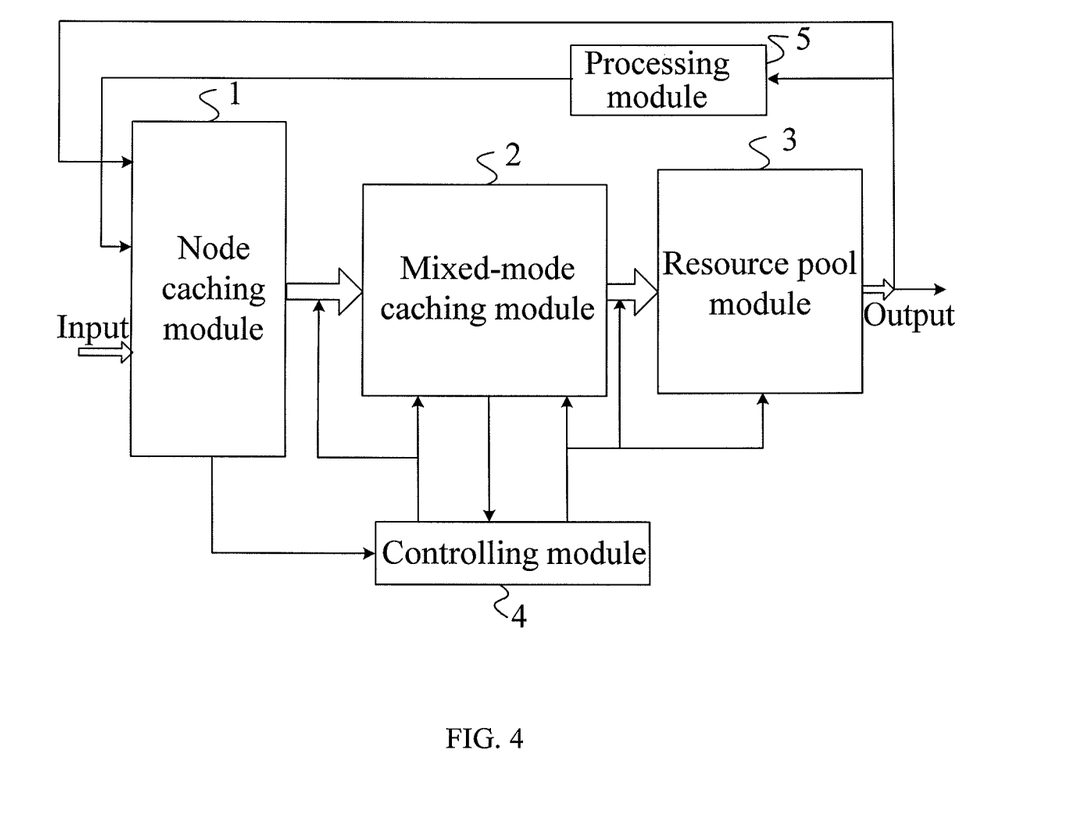
FIG. 4 shows a structure of a resource pool managing system in embodiment 3 of the present disclosure.

On the basis of the foregoing embodiments, the resource pool module 3 comprises a multiply-adding operation array submodule and an output logic submodule which are connected in sequence. The multiply-adding operation array submodule comprises a multiplier array and an adder array, adapted to perform filtering operations according to the resource pool selecting signal and the resource pool cache selecting signal sent by the controlling module 4. The output logic submodule comprises an output register group and a multilink selector adapted to, according to the output selecting signal sent by the controlling module 4, perform mapping and outputting of the node intermediate data obtained by performing the filtering operations to the node caching channel in the node caching module 1. Two counters may also set up in the node caching module 1, wherein the first counter is adapted to generate the read address under the control of mapping selecting signal and the second counter is adapted to generate the write address under the control of the node write enable signal sent by the controlling module 4. The node caching module 1 sends the congestion information of all node caching channels generated by two counters as the dispatching reference information to the controlling module 4. The controlling module 4 may choose to dispatch the node data with the highest congestion according to the congestion information of all node caching channels sent by the node caching module 1 and according to the priority of all preset node caching channels. If congestion of two nodes is the same, the controlling module 4 chooses to process the node data with higher priority to generate mapping selecting signals so as to instruct the node caching module 1 to output the data of the relevant node number to the mixed-mode caching module 2. In this embodiment, node data may be filtered through the resource pool module 3. FIG. 4 shows a structure of a resource pool managing system in embodiment 3 of the present disclosure. As shown in FIG. 4, if some handling processes are complicated to realize in the resource pool module 3, a processing module 5 may be added between the output end of the resource pool module 3 and the input end of the node caching module 3. The processing module 5 is adapted to perform secondary processing on the node intermediate data which is output by the resource pool module, e.g. phase equalization processing.

Figure 5:
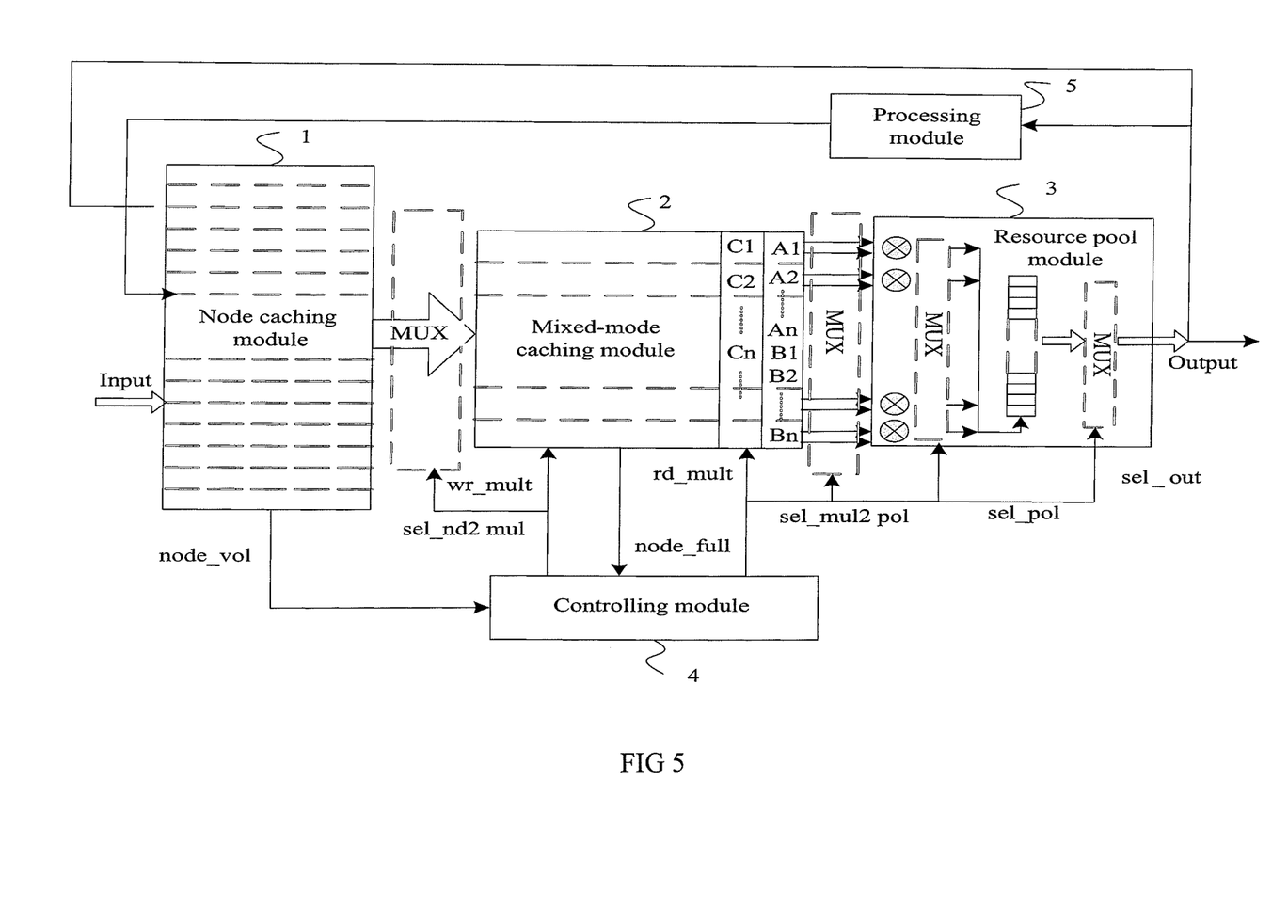
FIG. 5 shows a structure of a mode-mixing channel based on a resource pool in an embodiment of the present disclosure.

FIG. 5 shows a structure of a mode-mixing channel based on a resource pool in an embodiment of the present disclosure. As shown in FIG. 5, in the system structure, the node caching module 1 comprises multiple node caching channels adapted to cache the input node data or the intermediate operation data of other nodes on the link, which is implemented by using a Single-Access RAM circuit. That is, the same node data is not to be read and written at the same time. The amount of the Single-Access RAM is determined by the amount of external and internal nodes, and the depth of the Single-Access RAM is determined by the maximum bandwidth and data flow of the node. That is, the higher speed the data flow has, the bigger the caching depth is. The node write enable signal of the node caching channel is generated by the controlling module 4 which may generate the node write enable signal of the relevant node caching module 1 according to the status of "sel_out" to cache the operation data of the relevant node into the relevant node caching channel. The node read enable signal of the node caching channel is generated by the controlling module 4. Read and write addresses are generated by the counters, both of which are controlled by the read and write enable signal and generate and return the full or empty marks and congestion information (difference value of the read and write addresses) to the controlling module 4. According to the "node_vol" signal sent by the node caching module 1 and the priority information of each node software configuration, the controlling module 4 generates the read enable signal "sel_nd2mul", namely, the mapping selecting signal from the node caching module 1 to the mixed-mode caching module 2.

The mixed-mode caching module 2 is adapted to cache and dispatch the data array involved in the processing of the resource pool operation, which is implemented by using a Dual-Access RAM. That is, there may be both reading and writing operations while each node data is dispatched, but reading and writing do not use the same RAM address. The amount of the Dual-Access RAM is determined by the amount of the multipliers in the resource pool module 3 and the depth of Dual-Access RAM is determined by the amount of the nodes and the maximum instant bandwidth of the resource pool. That is, the more the nodes, the bigger the instant bandwidth and the more need for caches. The write enable, write address, read address, and read enable of the mixed-mode caching module 2 are generated by the controlling module. The controlling module 4 generates the write address signal "wr_mult" of the relevant mixed-mode caching module 2 according to the current address (two-dimensional pointer) of the mixed-mode caching module 2. The controlling module 4 generates the read address signal "rd_mult" of the relevant multiplier channel according to the status of the current mixed-mode caching module 2, for example, the full column indication, namely, "node_full" signal and priority configuration.

The resource pool module 3 is adapted to perform the filtering operation and output of the node data. The resource pool module 3 comprises a multiplier array, an adder array, an output register group and a multilink selector. The multiply-adding array is adapted to finish the main filtering operation and the output register group and multilink selector are adapted to finish the mapping and outputting of the output data to the node caching channel. The controlling module 4 dynamically generates the resource pool selecting signal "sel_mul2pol" according to the node priority of the software configuration and the full indication signal (if the same address of different multiplier channels is written in the data, the full column indication should be reported) of some column of the mixed-mode caching module 2. The controlling module 4 generates the resource pool cache selecting signal "sel_pol" according to the current operation node "sel_mul2pol". The controlling module 4 caches the operation outputting data of the resource pool module 3 into the node caching module 1 (intermediate operation node) of the relevant node or directly outputs them (link output node).

Figure 6:
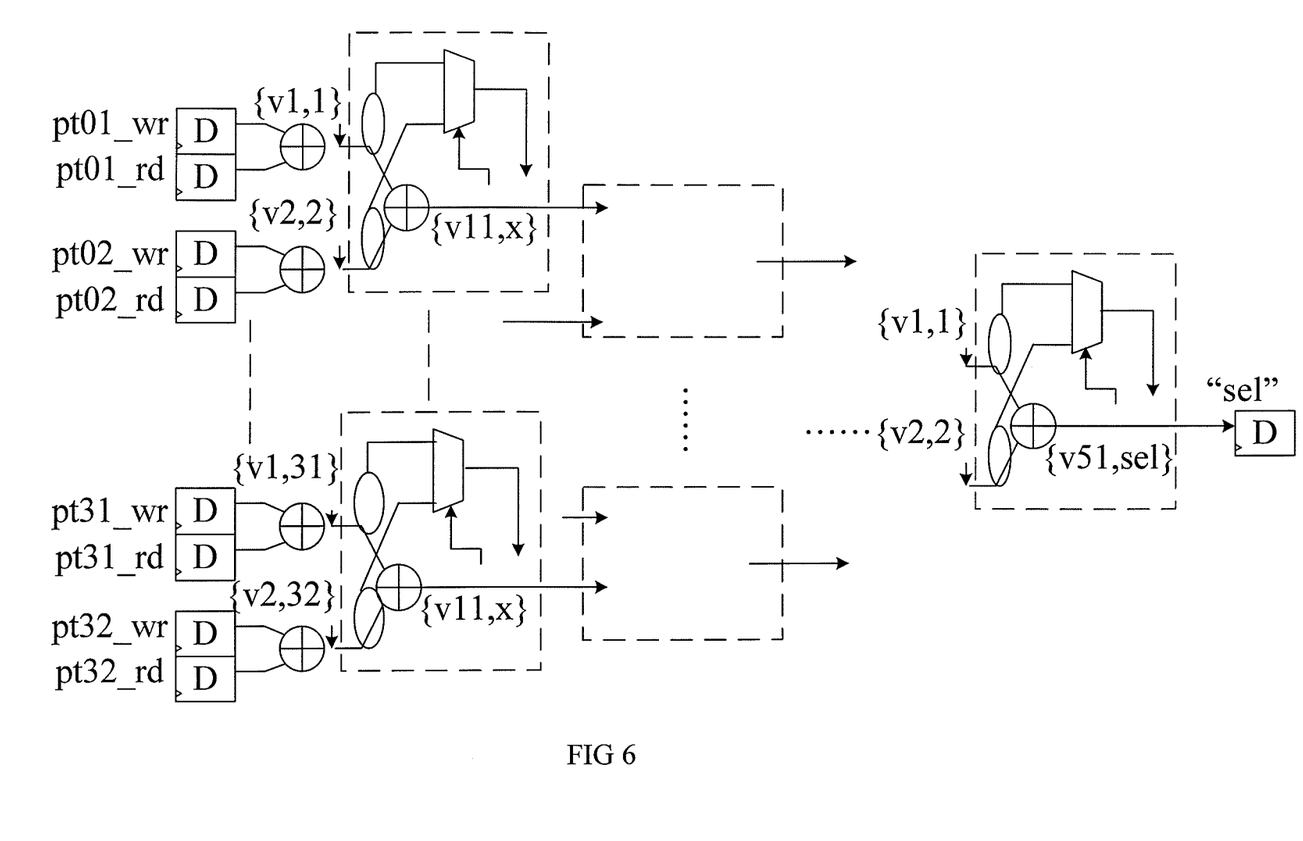
FIG. 6 shows a channel priority judging circuit of a mode-mixing channel in an embodiment of the present disclosure.

The above-mentioned mapping selecting signal "sel_nd2mul" from the node caching module to the mixed-mode caching module needs to determine the priority according to the current congestion. Take 32 nodes as an example to describe the generating logic of the priority: Comparison between one and another is a basic unit, and then the current node number with the highest congestion can be obtained after five-level comparison. FIG. 6 shows a channel priority judging circuit of a mode-mixing channel in an embodiment of the present disclosure. As shown in FIG. 6, the judgment and selection are made according to the situation of being empty or full in the node caching channel NODE_RAM: firstly generating 5 bit volume indication v1-v32 by the reading and writing pointer of each NODE_RAM, and then comparing one with another to obtain the node number "sel" with the biggest v.

In addition, some modules in the structure may make the control and logic design complicated, because their operations are more special than the traditional FIR filters, or only few resources are taken for operation, so they may connect to the operation link through IP series to simplify the design of the resource pool. Single or Dual-Access RAMs in the above embodiments may be replaced by the register resources and more resources are needed, but it is easier to control. The operation of non-FIR filters may also be finished in the resource pool, but it is more complicated. The selecting signal of NODE_RAM may also be determined according to the congestion of NODE_RAM and the status of MULT_RAM.

Figure 7:
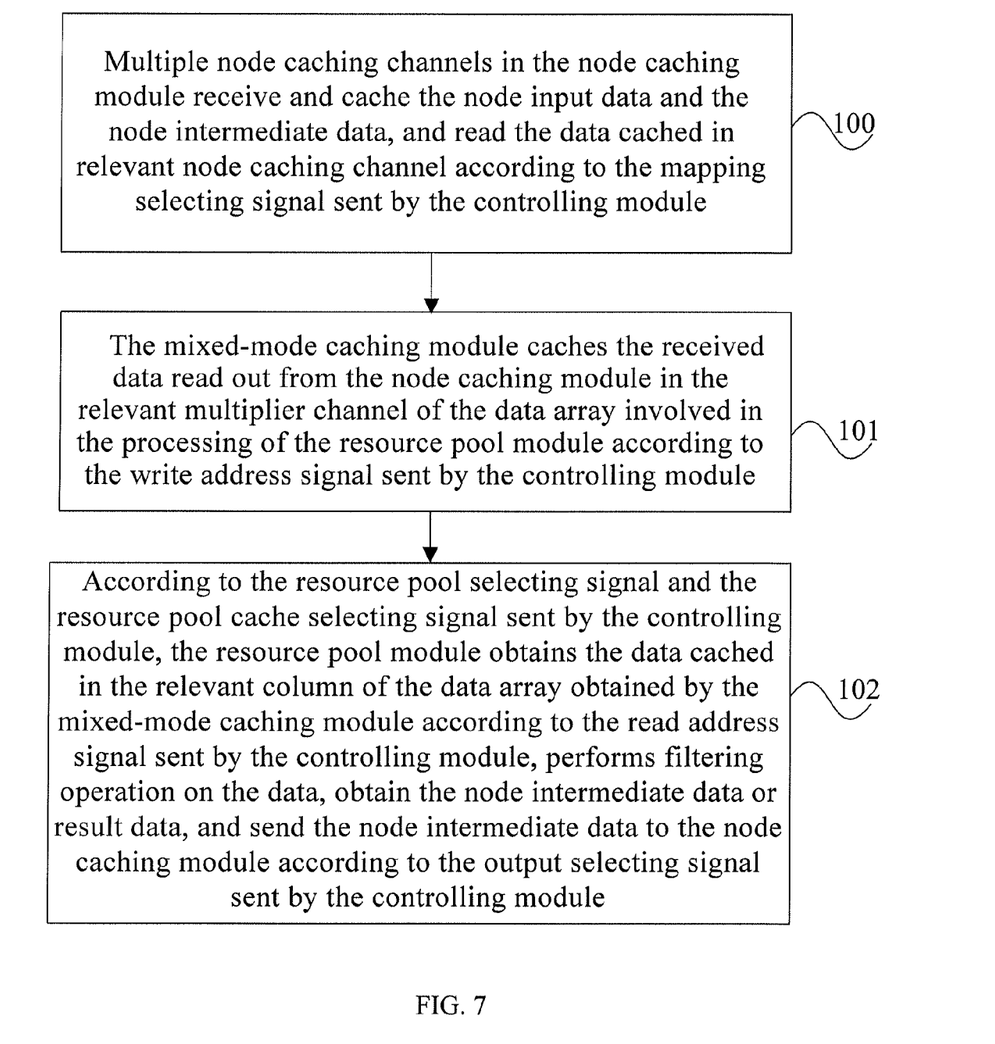
FIG. 7 shows a flowchart of a signal processing method in an embodiment of the present disclosure.

FIG. 7 shows a flowchart of a signal processing method in an embodiment of the present disclosure. As shown in FIG. 7, the method comprises:

Step 100: Multiple node caching channels in the node caching module receive and cache the node input data and the node intermediate data, and read the data cached in the relevant node caching channel according to the mapping selecting signal sent by the controlling module.

The relevant node caching channel of the node caching module caches the input data of the external nodes or the intermediate data of the internal nodes, and waits for the dispatching by the controlling module to perform further filtering operation. The controlling module generates the mapping selecting signal and selects the data in the node caching channel currently with the highest congestion and priority for further processing according to the congestion of each node caching channel and the priority of software configuration.

Step 101: The mixed-mode caching module caches the received data read from the node caching module in the relevant multiplier channel of the data array involved in the processing of the resource pool module according to the write address signal sent by the controlling module.

After receiving the data dispatched from the controlling module, the mixed-mode caching module caches the data at the proper position of the relevant data array according to the regulation and waits for filtering. The mixed-mode caching module receives the data output by the node caching module, caches into the relevant multiplier channel, and sends the status signal of the data array to the controlling module when the data array is full. According to the status signal of the data array, the controlling module generates the read address signal and returns to the resource pool module, and indicates the mixed-mode caching module the data to be output to the resource pool module for filtering.

Step 102: According to the resource pool selecting signal and the resource pool cache selecting signal sent by the controlling module, the resource pool module obtains the data cached in the relevant column of the data array obtained by the mixed-mode caching module according to the read address signal sent by the controlling module, performs filtering operations on the data to obtain the node intermediate data or result data, and sends the node intermediate data to the node caching module according to the output selecting signal sent by the controlling module.

The controlling module sends the resource pool selecting signal and resource pool cache selecting signal to the resource pool module and reconstructs the to-be-processed data according to the filtering regulation. The resource pool module performs filtering operations, specifically obtaining of data for the resource pool module according to the resource pool selecting signal sent by the controlling module, and performing filtering operations on the data according to the resource pool cache selecting signal sent by the controlling module. After finishing the operation, the result is obtained. If the result is the final filtering result, it is directly output; if the result is one stage while processing, the result is to be sent back to the node caching module. The specific caching location is controlled by the output selecting signal sent by the controlling module.

In the method for processing mixed-mode IF signal provided in an embodiment of the present disclosure, if some handling processes are complicated to realize in the resource pool module, a processing module may be added between the output end of the resource pool module and the input end of the node caching module. The resource pool module sends the node intermediate data to the processing module according to the output selecting signal sent by the controlling module. The processing module performs secondary processing on the node intermediate data which is output by the resource pool module, and sends the node intermediate data after secondary processing to the node caching module.

A method for processing mixed-mode IF signal is provided in an embodiment of the present disclosure. On the basis of resource pool, all filters on link share one set of operation resources and caching resources. The embodiment can be adapted to support different application scenarios with unequal carrier rates while mixing modes and the application scenarios with unequal carrier filter orders. Filter resources can be distributed according to needs. The embodiment also supports each stage of filters of the supporting mode-mixing system to share one set of multiply-adding and caching resources to unify the dispatching of resources in one resource pool and maximize the utilization of resources, and supports the parameterized configuration of links forward-backward stages, link parameter, and carrier rate, and so on. Filter structures are highly parameterized. The embodiment may make full use of resources and improve the system extensibility.

It is understandable to those skilled in the art that all or part of the steps in the preceding embodiments may be performed through hardware instructed by a program. The program may be stored in a computer-readable storage medium such as ROM, RAM, magnetic disk, and compact disk. When being executed, the program performs those steps in preceding embodiments.

It should be noted that although the disclosure is described through the above-mentioned exemplary embodiments, the disclosure is not limited to such embodiments. Those skilled in the art can make various modifications and variations to the disclosure without departing from the spirit and scope of the disclosure. The disclosure is intended to cover the modifications and variations provided that they fall in the scope of protection defined by the following claims or their equivalents.

What is claimed is:

1. A resource pool managing system, comprises:
a node caching module, a mixed-mode caching module, a resource pool module, and a controlling module; wherein:
the node caching module comprising multiple node caching channels for caching data processed by the resource pool module, wherein the node caching module is configured to:
send a storage status of the multiple node caching channels to the controlling module,
cache the data in one of the multiple node caching channels according to a node write enable signal sent by the controlling module; and
obtain the data cached in one of the multiple node caching channels according to a mapping selecting signal from the controlling module;
the mixed-mode caching module comprising multiple multiplier channels for caching a data array to be processed by the resource pool module, wherein the mixed-mode caching module is configured to:
cache the data obtained by the node caching module in the data array according to a write address signal sent by the controlling module, and
obtain the data in a column of the data array according to a read address signal sent by the controlling module;
the resource pool module is configured to perform filtering operations on the data in the column of the data array according to selecting signals sent by the controlling module; and
the controlling module is configured to:
control the node caching module by sending the node write enable signal, and sending the mapping selecting signal according to the storage status of the multiple node caching channels,
control the mixed-mode caching module by sending the write address signal and the read address signal, and
control the resource pool module by sending the selecting signals.

2. The resource pool managing system according to claim 1, wherein the resource pool module comprises:
a multiply-adding operation array submodule and an output logic submodule which are connected in sequence;
the multiply-adding operation array submodule which comprises a multiplier array and an adder array, adapted to perform filtering operations according to a resource pool selecting signal and a resource pool cache selecting signal sent by the controlling module; and
the output logic submodule which comprises an output register group and a multilink selector, adapted to map and output the node intermediate data to the node caching channel in the node caching module according to an output selecting signal sent by the controlling module, wherein the node intermediate data is obtained by performing the filtering operations.

3. The resource pool managing system according to claim 2, wherein the multiplier channel is implemented by using a Dual-Access Random Access Memory, the amount of the Dual-Access Random Access Memories is the same as the amount of multipliers in the multiplier array.

4. The resource pool managing system according to claim 2, wherein the node caching channel is implemented by using a Single-Access Random Access Memory.

5. The resource pool managing system according to claim 2, wherein the node caching module comprises: a first counter, adapted to generate a read address under the control of the mapping selecting signal; and a second counter, adapted to generate a write address under the control of the node write enable signal; wherein the first counter and the second counter are further adapted to generate the storage status, and wherein the storage status comprises congestion information indicating a congestion degree of the node caching channels.

6. The resource pool managing system according to claim 5, wherein the controlling module is further adapted to: generate the mapping selecting signal according to the congestion information and priority of the node caching channels.

7. The resource pool managing system according to claim 1, further comprising: a processing module, disposed between the output end of the resource pool module and the input end of the node caching module, adapted to perform secondary processing on the data processed by the resource pool module.

8. A signal processing method, performed by a resource pool managing system comprising a node caching module with multiple node caching channels, a mixed-mode caching module with multiple multiplier channels for caching a data array to be processed by a resource pool module, the resource pool module, and a controlling module, the method comprising:
receiving by the node caching module, data processed by the resource pool module;
caching by the node caching module, the data in a node caching channel according to a node write enable signal sent by the controlling module;
sending by the node caching module, a storage status of the node caching channels to the controlling module;
receiving by the controlling module, the storage status of the node caching channels;
sending by the controlling module, a mapping selecting signal according to the storage status of the node caching channels;
obtaining by the node caching module, the data cached in the node caching channel according to the mapping selecting signal from the controlling module;
caching the data by the mixed-mode caching module, in the data array according to a write address signal sent by the controlling module;
obtaining data in a column of the data array according to a read address signal sent by the controlling module; and
performing filtering operations on the data in the column of the data array according to selecting signals sent by the controlling module.

9. The signal processing method according to claim 8, wherein the storage status comprises congestion information indicating a congestion degree of the node caching channels.

10. The signal processing method according to claim 8, wherein the controlling module sends the read address signal to the mixed-mode caching module upon receiving a status signal from the mixed-mode caching module, the status signal indicates that the data in the data array is ready to be output.

11. The signal processing method according to claim 8, the mapping selecting signal is sent according to the congestion information and priority of the node caching channel.

* * * * *